United States Patent [19]

Stella

[11] 4,080,615
[45] Mar. 21, 1978

[54] PHOTOGRAPHIC PROCESSING FLUID APPLICATOR

[75] Inventor: Joseph A. Stella, Peabody, Mass.

[73] Assignee: Polaroid Corporation, Cambridge, Mass.

[21] Appl. No.: 772,752

[22] Filed: Feb. 28, 1977

[51] Int. Cl.² ............................................. G03D 5/00
[52] U.S. Cl. .................................. 354/317; 222/541; 352/130; 354/88
[58] Field of Search .................. 354/88, 89, 297, 317; 352/130; 206/438, 440; 229/43; 222/541

[56] References Cited

U.S. PATENT DOCUMENTS

| | | | |
|---|---|---|---|
| 2,946,478 | 7/1960 | Clair et al. | 222/541 UX |
| 3,472,138 | 10/1969 | Robin et al. | 354/88 |
| 3,722,754 | 3/1973 | Struble | 222/541 X |
| 3,778,140 | 12/1973 | Land | 352/130 |
| 3,921,190 | 11/1975 | Ell et al. | 354/88 X |

Primary Examiner—Fred L. Braun
Attorney, Agent, or Firm—Frederick A. Goettel, Jr.

[57] ABSTRACT

A processing fluid receptacle of a photographic processing fluid applicator for use in a photographic film cassette capable of processing latent images on exposed film without requiring removal of the film from the cassette. The receptacle has an aperture which is initially releasably sealed by a web comprising two sections angularly disposed relative to each other with one section folded over the other. One section serves to seal the aperture, the arrangement being such that when a pulling force is exerted on the other section, the web is peeled off the receptacle in such a way that separation initially takes place along one margin of the aperture only.

6 Claims, 5 Drawing Figures 4,080,615

PHOTOGRAPHIC PROCESSING FLUID APPLICATOR

CROSS REFERENCE TO RELATED APPLICATIONS

This application is a substitute application for abandoned U.S. application Ser. No. 582,433 filed May 30, 1975.

BACKGROUND OF THE INVENTION

The subject invention relates to photographic apparatus and, more particularly, to an applicator for treating a strip of photographic film material. The applicator is intended for particular use in a photographic film cassette of the kind capable of processing a strip of film contained therein.

DESCRIPTION OF THE PRIOR ART

Amateur motion picture photography has in recent years become ever more popular. Indeed, that section of the photographic industry which caters to the needs of the amateur motion picture film maker constitutes now a large portion of the photographic industry. Convention, not so much technical necessity, being what it is, the apparatus and film material used for making such motion pictures require processing of the exposed film at a locale removed from the photographer and without his control. The time between exposing the film and developing it, including the forwarding of the film from the photographer to the processing plant and its return sometime thereafter, has understandably been a source of considerable frustration to the photographer and it would thus be desirable to provide for motion picture equipment which is amenable to processing by the photographer with as little extrinsic work as possible.

Both such equipment and film have recently been proposed in a number of U.S. patents; see, for instance, U.S. Pat. No. 3,748,994. That patent teaches a photographic cassette having a strip of film therein which, after exposure, may be processed within the cassette by the photographer in apparatus such as a motion picture projector, capable of operating on the film without necessitating its removal from the cassette, in a certain sequence. Processing of the film is accomplished by a processing station housed within the cassette and rendered operative by the apparatus. The processing station comprises an applicator engaging the film during the processing operation for depositing thereon a layer of processing fluid to render visible, by the well-known diffusion transfer process, latent images recorded on the film. The applicator is connected to a receptacle, sometimes called a pod, which initially contains a processing fluid and which is provided with a seal which may be removed automatically at an appropriate time during the operating sequence of the apparatus so that the fluid is released to the applicator for coating onto the film. As shown in U.S. Pat. No. 3,748,994, the seal of the receptacle comprises a flexible web or tape attached at one end to the receptacle to seal an aperture provided therein and connected at its other end to means in the cassette for moving the film, the arrangement being such that when the apparatus is in its proper operating sequence, it will cause the tape to be removed from a position in which it seals the aperture. The aperture is of rectangular form, the short margins of which are positioned normal to the longitudinal axis of the film. Removal of the tape occurs by a peeling motion, commencing at one of the short margins of the aperture. The tape is made of a material inert to the processing fluid and possesses a tensile strength greater than the force exerted on it during its removal from the receptacle.

The bond between the sealing tape and the surface of the receptacle surrounding the aperture is preferably established by heat fusion. The bond is therefore a relatively strong one. Since the peeling motion occurs in a direction of the longitudinal axis of the aperture, relatively considerable force has to be exerted initially in order to overcome or break the bond in the area of the short margin of the aperture. It is therefore desirable to reduce the stress in the peeling tape, within this area, as much as possible in order to prevent breaking of the tape. Since the cassette is sealed, attempts at repairing a broken tape would be cumbersome at best and would very likely result in destruction of the unprocessed film.

BRIEF SUMMARY OF THE INVENTION

It is a general object of the present invention to provide for an improved applicator for treating a strip of photographic film material.

Another object of the invention resides in providing an applicator for treating a strip of photographic film material for use with a film processing station in a photographic film cassette of the kind capable of processing a film contained therein.

A more specific object of the invention relates to providing, in a motion picture film processing fluid receptacle, an improved seal between its aperture and sealing tape.

A further object of the invention is to provide a seal for a processing fluid receptacle which reduces the stress of the forces exerted on the seal to open it.

Furthermore, an object of the invention is to provide for an improved motion picture film cassette of the kind capable of processing a film contained therein after its exposure.

In the accomplishment of these and other objects, the invention provides for an applicator for treating a strip of photographic film, comprising means for applying a processing fluid to the strip of film; a container for the fluid, operatively connected to the applying means, comprising a hollow receptacle provided in one of the surfaces with an opening extending along a predetermined axis; web means comprising a strip of flexible material having first and second integral sections, the first section being attached to a surface releasably to seal the opening and extending in the direction of the axis, the second section being folded over the first section along the fold line extending askew to the axis, the arrangement being such that the web may be peeled off the surface along a line of separation extending askew to the axis by a pulling force exerted on the free end of the second section and extending in a direction of the axis.

In a more specific embodiment of the invention, a photographic film cassette is provided which comprises a housing, a strip of initially unexposed photographic film material movably mounted in the housing, the housing being provided with a station configured for exposing the film; means for processing the film within the housing including an applicator means for applying a processing fluid to the strip of film; a container for the fluid, operatively connected to the applying means, comprising a hollow receptacle provided in one of its surfaces with an opening extending along a predetermined axis; web means comprising a strip of flexible material having first and second integral sections, the first section being attached to the surface releasably to seal the opening and extending in the direction of the axis, the second section being folded over the first section along a fold line extending askew to the axis, the arrangement being such that the web may be peeled off the surface along a line of separation extending askew to the axis by a pulling force exerted on the free end of the second section and extending in a direction of the axis; and means for exerting a force on the tape or web to cause it progressively to release the tape or web from the surface starting at a point at which the askew fold line first intersects a corner formed by two margins of the opening.

BRIEF DESCRIPTION OF THE DRAWINGS

These and other objects are hereinafter described, by way of example, with reference to the appended drawings in which.

DETAILED DESCRIPTION OF THE INVENTION

Figure 1:
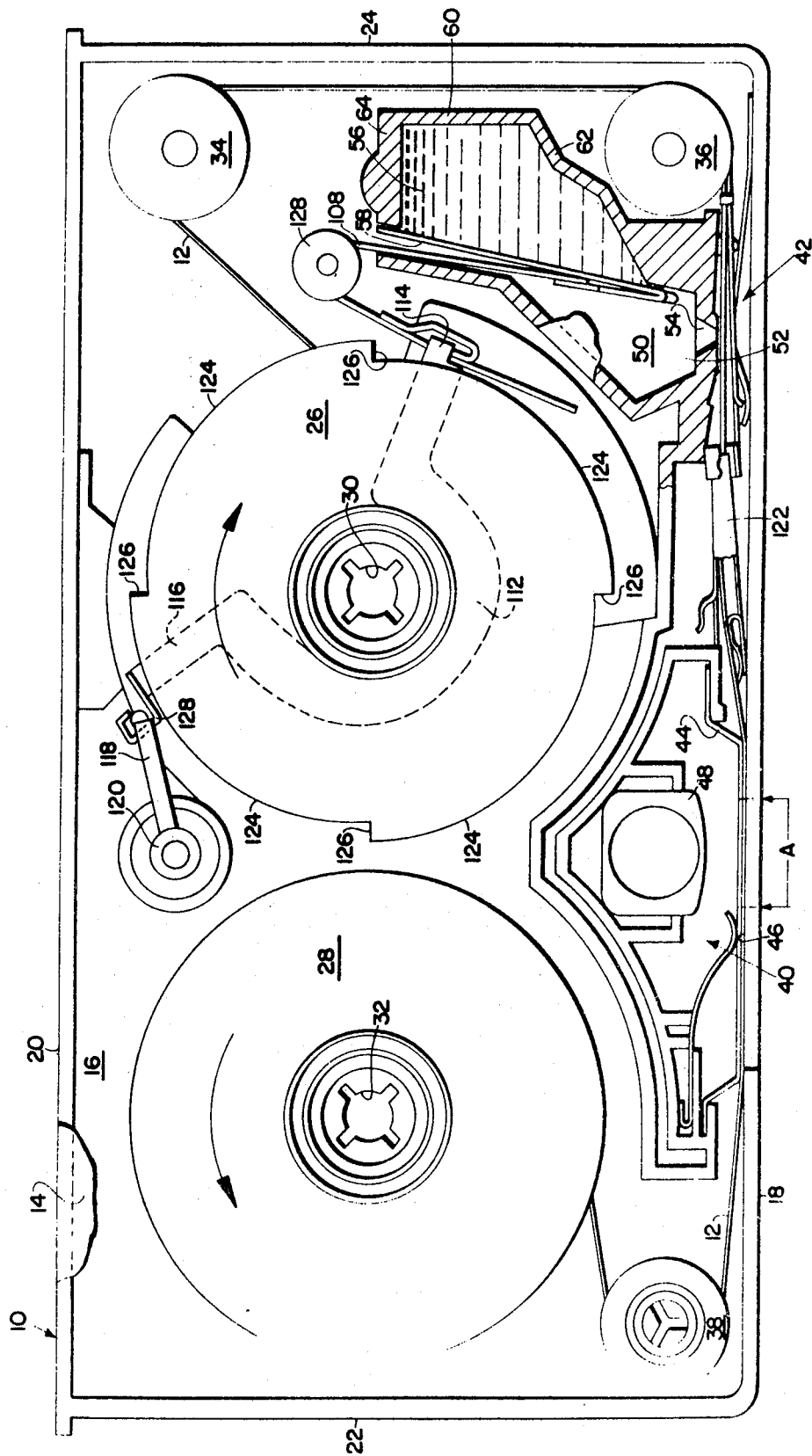
FIG. 1 is a planar view, with parts broken away for clarity, of a motion picture film cassette having a novel seal for a processing fluid receptacle.

A motion picture film cassette 10 is shown which comprises a housing preferably made of material impervious to actinic radiation for purposes of preventing unwanted exposure of a strip of film 12 contained therein. The housing is of generally parallelepiped configuration having two opposing side walls 14 and 16, a forward wall 18, a rear wall 20, and opposing end walls 22 and 24. The film 12 is mounted within the cassette 10 for movement between a supply reel 26 on which it is initially coiled before its exposure in a camera (not shown) and a take-up reel 28 onto which it is wound during such exposure and at other times as described infra. Opposite ends of the film are fastened to the reels 26 and 28. Both reels 26 and 28 are appropriately journaled on a common plane within the cassette 10 as, e.g., on studs (not shown) protruding from one of the side walls 14 or 16. Suitably positioned apertures in the other side wall render driving hubs 30 and 32 of the reels 26 and 28, respectively, accessible to drive means provided in a camera (not shown) or projector (not shown) for rotatably driving the reels 26 and 28 unidirectionally so that a number of operations, such as exposure, processing and projecting as well as winding, may be performed on the film 12 in a predetermined sequence. The film 12, in moving from one reel to the other by virtue of their rotation, is guided along a path including idler rolls 34, 36 and 38 rotatably mounted on side wall 16 through operating stations 40 and 42 provided in the cassette 10. At least one of the idler rolls, here 38, is selectively engeable through an aperture (not shown) in side wall 14 by extrinsic means mounted in the camera or projector for imparting a tension to the film appropriate to assure motion of the film 12 at uniform linear speed.

Operating station 40 serves a double purpose. It is a film exposure station permitting incremental sections of the film 12 to be exposed as it is moved within a camera. For this purpose, it is provided with an aperture indicated to be positioned in the forward wall within an area marked "A". The aperture, during exposure of the film, is in registry with the optical path of the taking lens of the camera. A spring loaded apertured pressure plate 44 and a cooperating guide surface 46 provided on the inner surface of forward wall 18 positioned the film at the focal point of the lens of the camera.

Station 40 also serves as a projecting station when the cassette 10 is mounted in a projector. To this end, it is provided with a prism 48 in registry with an aperture in one of the side walls 14 or 16 and the aperture in area "A" of forward wall 18. Light from a projection lamp (not shown) entering the prism 48 through the aperture in the side wall is refracted by the prism 48 and redirected through the film 12 and the aperture in wall 18 to project an image recorded on the film on a projection screen (not shown).

The other operating station 42 is a film processing station which permits developing latent images recorded on the film 12 without removing the film 12 from the cassette 10. Such development is accomplished during a predetermined step in the operating sequence of a projector (not shown) into which the cassette is loaded after film exposure in the camera. The projector may operate fully automatically and may be equipped with sensors to determine, when a cassette 10 is inserted into it, whether or not processing of the film 12 is required, before the operating sequence of the projector is switched to a projecting mode. To this end, the sensors in the projector may be responsive to various means or conditions of the cassette 10. An example of such sensors has been described in U.S. Application Ser. No. 384,382, filed July 31, 1973, now U.S. Pat. No. 3,851,958.

The processing station 42 comprises an applicator 50 suitable for depositing a layer of uniform thickness of processing fluid onto a light sensitized emulsion on the film 12. The applicator 50 has a housing 52 mounted within the cassette 10 adjacent supply reel 26. It is provided with a nozzle 54 through which the processing fluid is deposited onto the film 12. The housing may be filled with a wicking material for uniform flow of the processing fluid. This fluid is initially contained in a receptacle 56 which is in operative engagement with the applicator 50 and is provided with a seal 58, such as a flexible web or tape, to prevent unwanted escape of the processing fluid from the receptacle 56 into the applicator 50.

Figure 2:
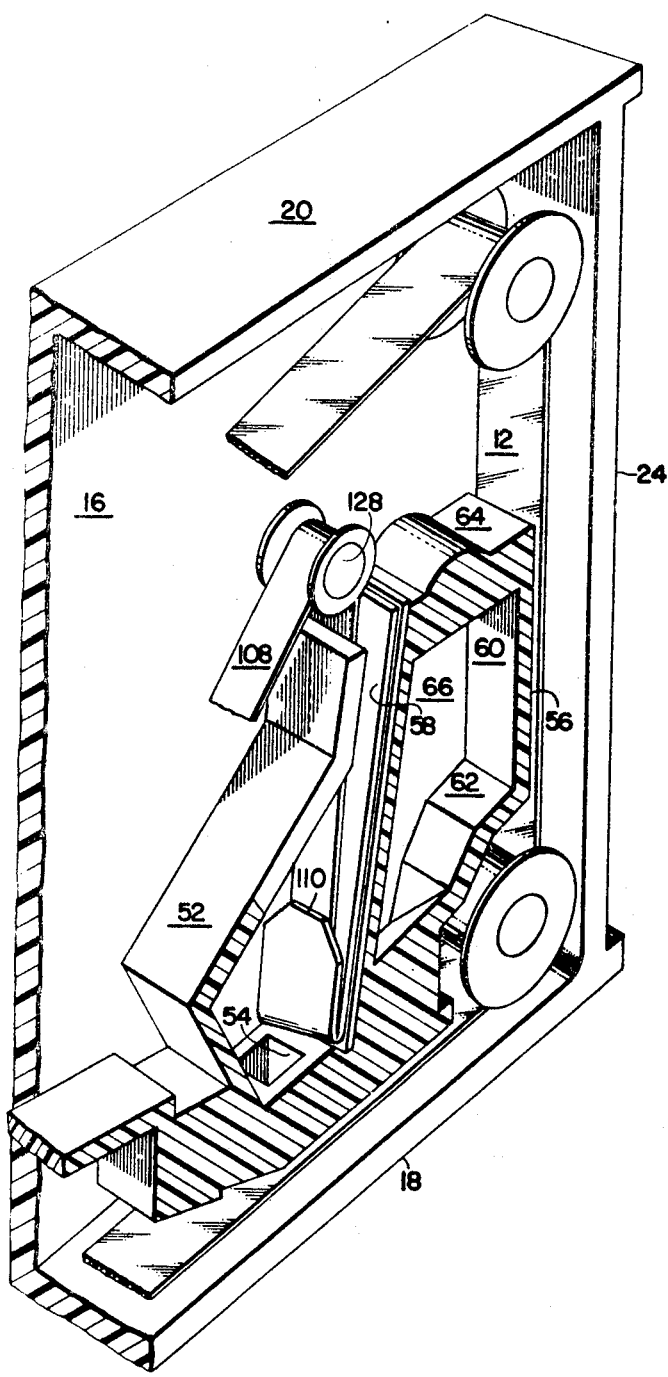
FIG. 2 is a perspective view on an enlarged scale, and partly in section, of the receptacle and seal shown in FIG. 1.
Figure 3:
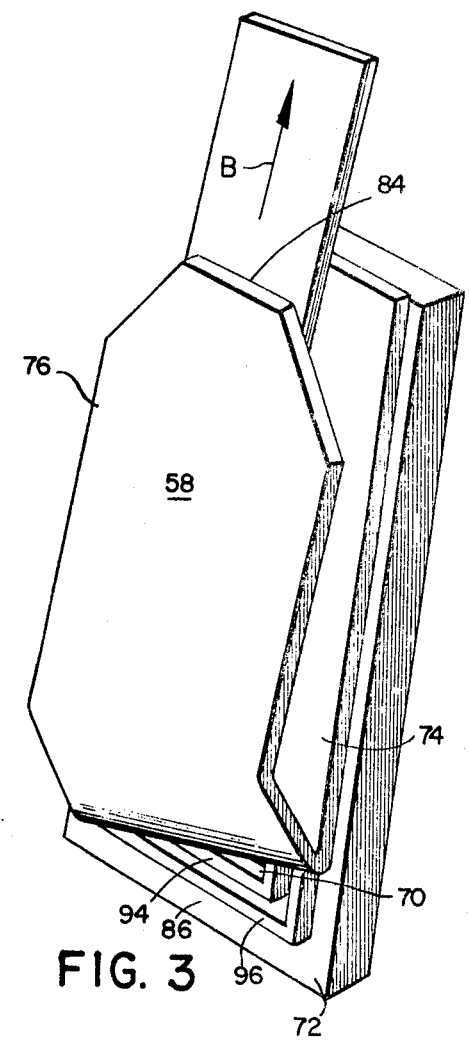
FIG. 3 is a perspective view of the receptacle and seal, on a greatly enlarged scale, showing the initial separation of the seal from the receptacle.

The receptacle 56, as shown in FIGS. 1 and 2, comprises a bottom wall 60, opposing end walls 62 and 64, and side walls 66 and 68 forming together a cavity of sufficient volume to accommodate a quantity of processing fluid required for coating substantially the entire length of film 12. End walls 62 and 64 and side walls 66 and 68 embrace a generally rectangular aperture 70. The aperture 70 may be surrounded by a flange 72 which may, as shown in FIG. 3, be provided with protruding lips 94 and 96. The lips 94 and 96 serve releasably to retain the seal or web 58 in covering relationship to the aperture 70. The web 58 may be attached to the lips 94 and 96 by heat fusion, high frequency welding, adhesive, or any other appropriate means or process which results in a strong though openable bond between the web and the lips. It will be apparent to those skilled in the art that the lips 94 and 96 are not essential and that the web 58 may, instead, be attached to the flange 72 direct. Separation of the web 58 from the receptacle 56 is accomplished in the manner and by the means set out below.

Figure 4:
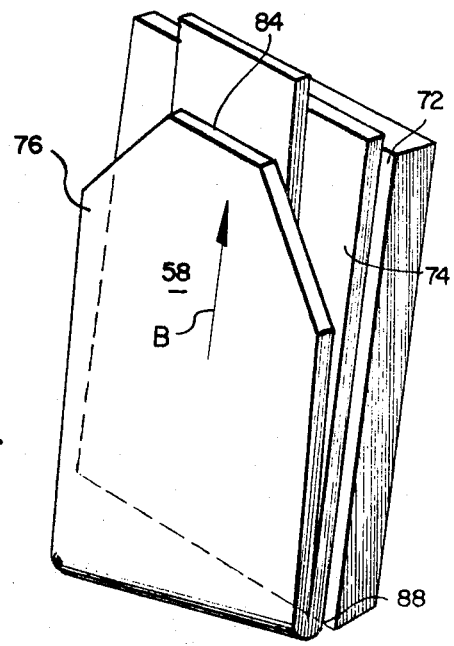
FIG. 4 is an enlarged scale perspective view of the receptacle and seal in their sealed relationship.
Figure 5:
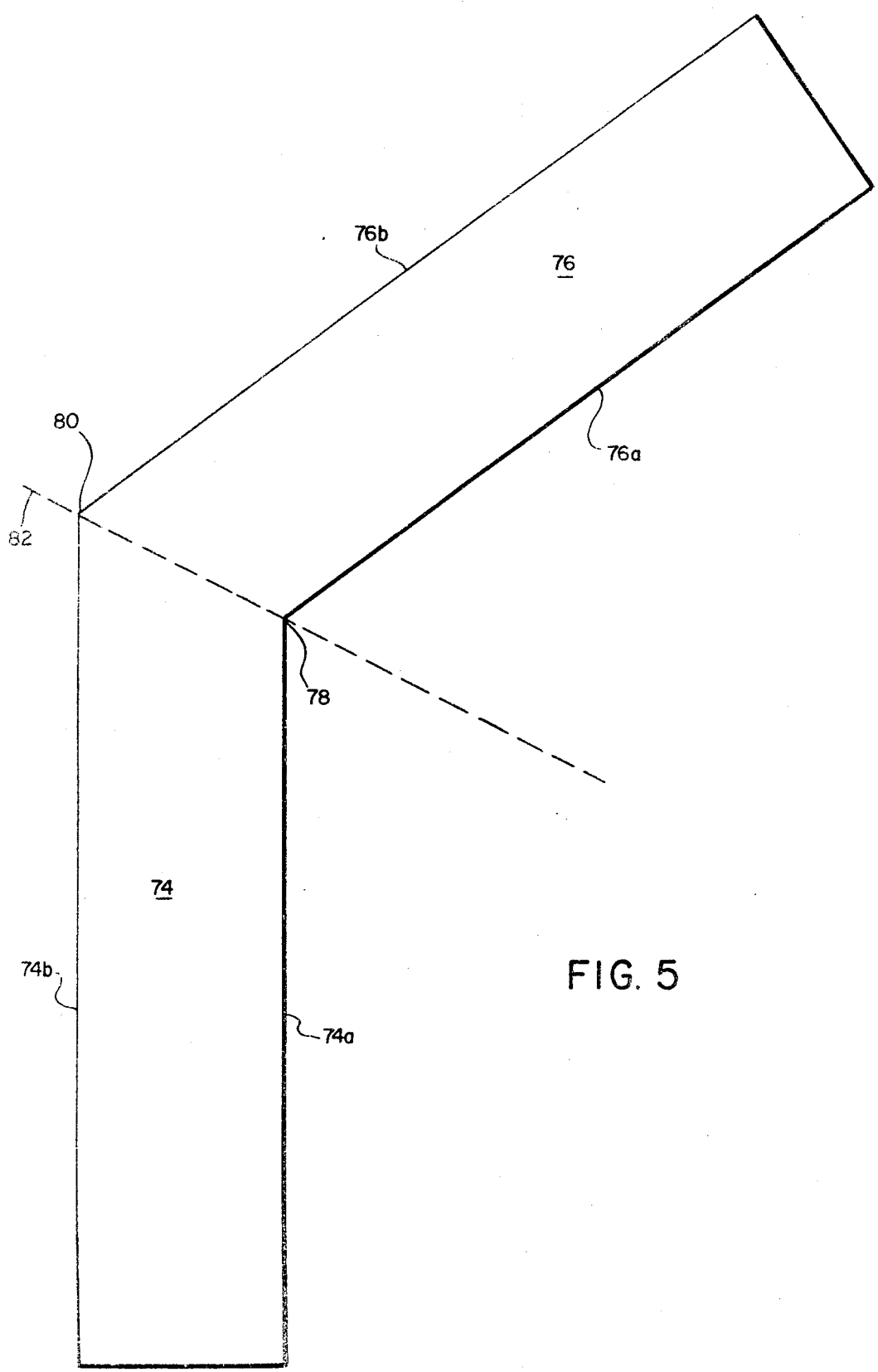
FIG. 5 is a planar view, on an enlarged scale, of the sealing strip.

As shown in FIGS. 3, 4, and 5, the web comprises a strip having two sections 74 and 76 disposed angularly with respect to each other and forming, between them, an inner corner 78 and an outer corner 80. The sections 74 and 76 are folded over each other along an imaginary line 82 intersecting the corners 78 and 80 whereby the longitudinal margins 74a and 74b of section 74 become disposed parallel to longitudinal margins 76a and 76b. The superimposed sections 74 and 76 of the web 58 thus form a trapezoid having one canted margin coinciding with line 82.

In the arrangement shown, section 74 is attached to the receptacle whereas the free end 84 of section 76 is fastened to a draw tongue 108 to be explained infra. As shown in FIG. 3, section 74 is attached to the receptacle 56 in such a manner that the corner formed by the inner corner 78 is flush with a corner of the flange 72. That corner of section 74 formed by outer corner 80 is located at a point beyond the flange 72. The advantage to be derived from this arrangement is that if a pulling force is exerted on the free section 76 in the direction of the arrow B, the section 74 is peeled off the flange 72 initially along margin 74a and along margin 86 of the flange. This arrangement results in an initial concentration of the pulling force at corner 88 of the flange and subsequent gradual peeling of the section 74 off the flange 72, thus requiring pulling forces weaker than those required were initial separation to take place along the entire margin 86 of flange 72. Not only is a lesser pulling force required to effect peeling of the web 58 off the receptacle 56, but also the possibility of rupture or tearing of the web 58 along margin 86 is substantially reduced.

There is provided in the cassette 10 means for selectively severing the sealing tape or web 58 from the receptacle 56 by peeling it off the flange 72 underlying the inner corner 78. To this end, the web 58 is attached at its section 76, as seen in FIGS. 3 and 4, to a draw tongue 108 comprising a flexible tape. One end of the tongue 108 is, for purposes to be described infra, releasably fastened to the section 76 at 84, the other end being connected to an actuating lever 112 (FIG. 1). The lever 112 is generally U-shaped and is provided with flaring extensions 114 and 116. The knee of lever 112 is mounted for limited rotation about the hub 30 of supply reel 26. Extension 114 is fastened to the draw tongue 108, and extension 116 is connected to a link 118, the latter being provided for rotating the lever 112 in a direction affecting peeling of web 58 from the receptacle 56.

The link 118 is rigidly mounted on a stub 120 which may be mounted for axial displacement in the side wall 16 in a direction normal to its plane. The axial displacement of the stub 120 is accomplished by transducing means provided in the projector (not shown) at a time when sequencing means thereof signal that the cassette 10 mounted therein is in proper condition for processing the film. Such sequencing means may be controlled by physical irregularities, such as hooks or protrusions, deliberately provided at or near one or both ends of the film 12 so that when the irregularity engages a sensor, as for instance, a channel guide 122 provided in the cassette 10, the transducing means which are in contact with the sensor 122 cause the stub 120 with the attached link 118 to be pushed away from the side wall 16.

As shown in FIG. 1, the periphery of reel 26 is provided with a plurality of camming surfaces 124 each ending in an abrupt step 126. While when the stub 120 is in its retracted position, the reel 26 may rotate freely, forward movement of the stub 120 will result in a cam follower 128 secured to the end of lever extension 116 being pushed into the rotational path of reel 26, thereby engaging one of the camming surfaces 124. This, in turn, will cause the lever 112 to be pivoted in a clockwise direction when the reel 26 subsequent to the forward thrust of stub 120 is rotated in that direction. In so doing, it is disconnected from link 118. Such pivoting of the lever 112 causes the tongue 108 to be moved downwardly as seen in FIG. 1. In so moving, the tongue 108 pulls the section 76 upwardly, upward motion thereof being the result of the tongue 108 extending around an idler roll 128 journaled in side wall 16. The section 74 is thus peeled off the flange 72, or lips 94 and 96, as the case may be, beginning at a point underlying and flush with inner corner 78 of the web 58 in a gradually widening pattern until separation along margin 86 reaches the margin of the flange 72 under margin 74b of the web section 74. From then on, separation occurs along both longitudinal margins 74a and 74b at the same time.

As will be appreciated by those skilled in the art, the force required initially to peel the web 58 off the flange 72 beginning at one of its corners only is substantially less than if the web 58 had to be severed along the entire length of margin 86 of the flange 72. Therefore, the impact of the initial pulling force can be absorbed in one area of initial peeling action, and is then gradually flared out as described. Thus, otherwise possible tearing of the web 58 or its defective separation from the receptacle 56 is effectively avoided.

As soon as the aperture 70 of the receptacle 56 is entirely uncovered, the draw tongue 108 is severed from section 76 of the web 58, as by tearing, so that the reels 26 and 28 may continue rotating to rewind, and in doing so, move the film 12 by the nozzle 54 of the processing station 42 to receive a coating of processing fluid.

While the invention has been described substantially in connection with one embodiment only, it will be obvious to those skilled in the art that certain variations of the invention lie fully within the ambit of the invention.

What is claimed is:

1. Apparatus for treating photographic film with processing fluid, said apparatus comprising:
a housing configured for retaining photographic film material;
processing means within said housing for treating the film with processing fluid to develop the film after exposure thereof, said processing means including a hollow receptacle configured for retaining the processing fluid, a given surface of said receptacle having an opening therein formed with a perimeter having at least one substantially straight edge portion, a flexible strip having a first and second section joined together with one end of said first section in connection to one end of said second section, said first section being located on said receptacle and affixed in sealing relation to said perimeter with said one end of said first section adjacent said edge portion, and said second section being joined to said one end of said first section such that when said second section is folded back over said first section, in an orientation substantially normal to said straight edge portion, a fold line is formed between said sections adjacent and at a given angle askew to said edge portion; and means for advancing said second section back over said first section along a path substantially normal to said straight edge portion so as to fold said first section back on itself along said fold line askew to said edge portion and to progressively advance said fold line across said edge portion at said given angle so that said strip is thereby initially removed from said receptacle along a line askew to said edge portion.

2. The apparatus of claim 1 wherein said perimeter is rectangular having a pair of opposed longitudinal edges and a pair of transverse edges, said one edge portion being one of said transverse edges, said path of advancement of said second section being substantially parallel to the longitudinal axis of said perimeter, and said first section and said second section elongated, said first section being affixed to said perimeter so that the longitudinal axis of said first section overlies and is aligned with said longitudinal axis of said perimeter, and said first and second section being joined to form said fold line at said given angle to said one straight edge portion when the second section is folded over said first section so that the longitudinal axis of said second section is aligned in overlying relation to said longitudinal axis of said first section.

3. The apparatus of claim 1 wherein said second section is initially folded back over said first section, and said advancing means includes means for advancing the other end of said second section back over said first section along said given path in a direction away from said one edge portion and for guiding said second section along said given path overlying and substantially normal to said edge portion.

4. In a film cassette configured for treating photographic film with processing fluid, said apparatus having a processing fluid receptacle sealed by a folded strip which is to be removed by advancement of said strip along a given path back on itself, said strip including a first and a second section connected with one end of said first section joined to one end of said second section, said first section having a given axis parallel with said given path, at least said first section being of flexible material, and said strip being removed by folding said second section back over said first section and advancing said second section along said given path towards the end of said first section opposite said one end, the improvement comprising:

said strip being initially formed such that when said second section is folded over and advanced along said given path, a fold line is provided in said strip at a given angle other than normal to said given axis of said first section and progressively advanced along said given axis thereof while maintaining said given angle thereto thereby progressively removing said first section from said receptacle along a line extending askew to said given path and said given axis of said first section.

5. The apparatus of claim 4 wherein said receptacle includes a rectangular opening having its longitudinal axis aligned with said given path and having at least one transverse edge normal to said longitudinal axis, said first section is an elongated member affixed to said receptacle in sealing relation to said one edge and other perimetric portions of said opening with said one end of said first section adjacent said one edge and the longitudinal axis of said first section aligned with said longitudinal axis of said opening, and said second section is an elongated member joined along a common border to said one end of said first section so that when said strip is in an unfolded planar condition, the longitudinal axes of both said sections form an angle configured to provide said border at said given angle to the longitudinal axes of both sections and thereby form said fold line at said given angle when said second section is folded over said first section and advanced along said given path with said longitudinal axis of said second section in overlying relation with said longitudinal axis of said first section.

6. An applicator for treating photographic material with processing fluid, said applicator comprising a receptacle configured for retaining a quantity of processing fluid, a given surface of said receptacle having an opening therein formed with a perimeter having one substantially straight edge, an elongated strip sealing said opening and configured to be at least partially removed therefrom to open said receptacle by folding and advancing the strip back upon itself across said one edge along a given path substantially normal to said one edge, said strip including a first and second section joined together along a common border with one end of said first section connected to one end of said second section, said first section being affixed to said perimeter in sealing relation to said opening with said border adjacent to and extending substantially along the length of said one edge, and said second section joined to said first section to provide said border at a given angle to said one edge so that when the other end of said second section is folded over said first section and advanced across said one edge along said given path, the fold line formed thereby in said strip progresses at said given angle to and across said one edge portion to open said receptacle.

* * * * *